Sept. 10, 1968   O. K. HOBBS   3,400,814
APPARATUS FOR REMOVING STONES FROM PEANUTS
Filed June 1, 1966
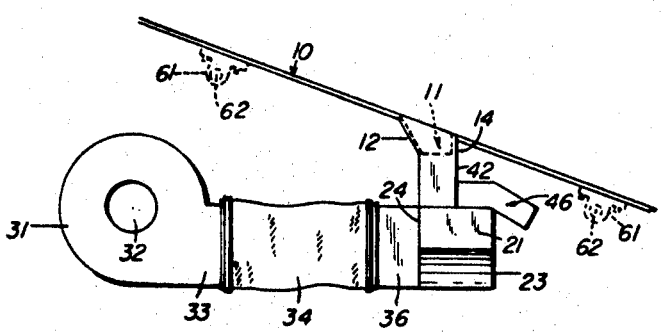
FIG. 1
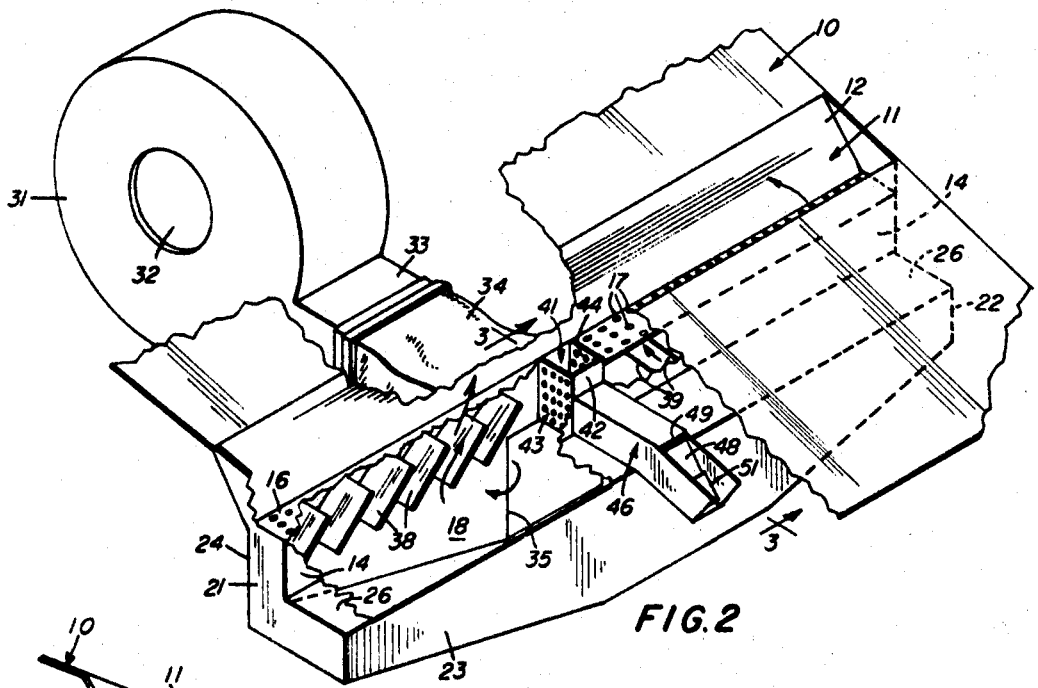
FIG. 2
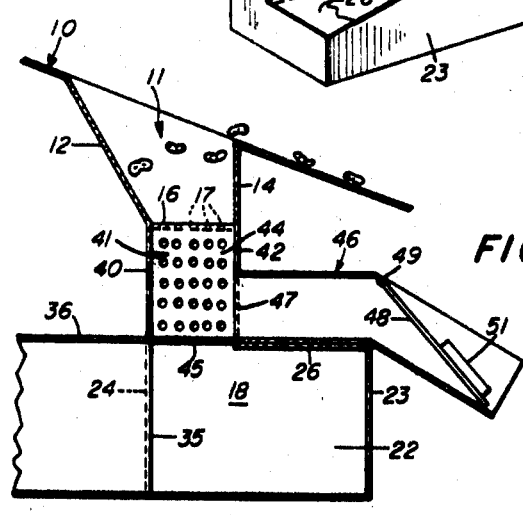
FIG. 3
INVENTOR
OLIVER K. HOBBS
BY 
ATTORNEY United States Patent Office 3,400,814
Patented Sept. 10, 1968

3,400,814
APPARATUS FOR REMOVING STONES
FROM PEANUTS
Oliver K. Hobbs, P.O. Box 1306,
Suffolk, Va. 23434
Filed June 1, 1966, Ser. No. 554,492
5 Claims. (Cl. 209—20)

The present invention relates to apparatus for removing stones and similar dense items from peanuts and to apparatus which may form an attachment or an adjunct to cleaning equipment wherein sticks, vines and other debris are first separated from the peanuts.

Peanuts grow in the ground and during the harvesting thereof stones are often collected with the peanuts and such dense articles are not removed from the presence of the peanuts by cleaning apparatus which separates sticks and lightweight debris from the peanuts. Thus stones are delivered with the peanuts as they escape from the cleaning equipment which remove lightweight foreign matter from the peanuts. It is accordingly an object of the present invention to provide apparatus which may serve as an adjunct or attachment to peanut cleaning equipment or apparatus which functions as an independent unit for removing stones from the peanuts after other debris has been removed from the peanuts.

A more specific object of the invention is to provide cleaning apparatus wherein the peanuts with stones and other dense articles mixed therewith are vibrated causing the heavier items to gravitate to positions under the peanuts and with the dense articles and the peanuts thus stratified are delivered into upwardly moving air streams which lift the peanuts to positions where they escape over a barrier while the stones and heavy articles sink in the air streams and are separately collected whereby the dense debris is separated from the peanuts.

Other objects and features of the invention will be appreciated and become apparent as the present disclosure proceeds and upon consideration of the accompanying drawing taken in conjunction with the following detailed description wherein an embodiment of the invention is disclosed.

In the drawing:

FIG. 1 is a side elevational view of apparatus embodying the invention.

FIG. 2 is a perspective view on a larger scale with portions broken away and illustrating the relationship of structural features of the apparatus.

FIG. 3 is a fragmentary sectional view taken on the line 3—3 of FIG. 2.

The invention pertains to apparatus for separating stones and other dense debris from peanuts and it may be used for such purposes as self-contained mechanism or the apparatus may form an adjunct to peanut cleaning equipment or an attachment for a combine wherein sticks and other lightweight debris is first separated from the peanuts. The apparatus shown in the drawing includes essential structural elements for removing stones and other dense debris from the peanuts or it may form an attachment to peanut cleaning equipment.

In FIG. 1 an inclined plate structure 10 is adapted to receive the peanuts and the stones mixed therewith at the upper end portion thereof. A trough 11 is formed in the lower portion of the inclined plate structure 10. The trough 11 extends transversely of the plate structure 10 and across the width thereof. The upstream side of the trough 11 is formed by a wall 12 which is inclined to the horizontal at a greater angle than the inclination of the plate structure 10. The downstream side of the trough 11 is formed by a wall 14 which is disposed in a substantially vertical plane whereas the upstream wall 12 of the trough is disposed at an angle to approximately thirty degrees with respect to the vertical plane of the wall 14.

The bottom wall of the trough 11 is formed by a plate 16 having substantially circular openings 17 therethrough. The holes 17 are substantially equally spaced throughout the bottom wall 16 and the total area of the opening 17 constitutes approximately thirty percent of the total area of the bottom wall 16.

The apparatus includes structure which provides a closed chamber 18 under the trough 11. In the embodiment illustrated in the drawing the chamber 18 is formed by end walls 21 and 22 and side walls 23 and 24. A top wall 26 closes the chamber 18 in the portion located downstream of the trough 11. The apparatus includes a fan 31 of the centrifugal type so that air is drawn into the inlet opening 32 and discharged through an outlet 33. The fan may be supported in any suitable fixed manner and when the present apparatus forms an adjunct to other cleaning equipment it may be mounted on and supported by such equipment. The outlet 33 of the fan 31 is desirably connected by a flexible duct section 34 to an inlet fitting 36 carried by the wall 24 of the structure which forms the chamber 18. Air delivered by the fan 31 is thereby guided into the chamber 18 and through the inlet opening 35.

Two groups of vanes 38 and 39 are mounted within the chamber 18 in fixed positions. These vanes may be welded or otherwise secured to the wall 24 and to the wall 14. The group of vanes 38 shown at the left in FIG. 2 are in parallel spaced relationship and are inclined in the same direction in proceeding upwardly and the upper ends of the vanes terminate under and adjacent the bottom wall 16. A similar group of vanes 39 within the chamber 18 at the opposite side of the center line of the plate structure are inclined in an opposite direction in proceeding upwardly to the bottom wall 16 of the trough. The two groups of vanes converge towards the center line of the plate structure 10. The chamber 18 serves to decelerate the air delivered thereinto by the fan 31 and the air in the chamber 18 is diverted towards the midportion of the trough 11 by the vanes 38 and 39 as the air escapes through the holes 17 in the bottom wall of the trough 11.

A well is provide at the midportion of the trough 11. The well is formed by a wall portion 42 which is a continuation of the downstream wall 14 of the trough and by the spaced vertical walls 43 and 44 and a wall portion 40. The walls 43 and 44 are provided with apertures as best shown in FIGS. 2 and 3. The lower end of the well 41 is in open communication with the chamber 18 through an apertured bottom wall 45. A chute 46 extends from the wall portion 42 and is in communication with the interior of the well immediately above the bottom wall 45 through an opening 47. The chute 46 forms an outlet for the dense items or articles separated from the peanuts. A plate 48 is mounted on the chute for pivoting movement at 49. The plate 48 carries a mass 51 which serves to hinge the plate 48 downwardly to a position as shown in FIG. 3.

When the apparatus for removing stones and heavy items from the peanuts forms a part of other cleaning equipment the plate structure 10 may be supported and set in vibration by the cleaning equipment. If the apparatus for removing stones from peanuts functions as independent mechanism the plate structure 10 may be supported by bearings 61 and eccentric shafts 62 (FIG. 1) which cause the plate structure 10 to vibrate and to move in a gyratory cycle of small radius. Such movement of the plate structure 10 causes the structure which forms the deceleration chamber 18 and the trough 11 and the chute 46 to vibrate and move with the plate structure 10. Such vibratory movements of the plate structure 10 causes the peanuts and heavy articles to spread on the surface of the plate 10 and move downwardly thereon. The dense items assume positions under the peanuts which are of less density and tend to assume positions above the stones or the like.

As the peanuts and the dense debris arrive over the trough 11 jet streams of air emitted from the holes 17 in the bottom wall 16 lift the peanuts sufficiently to be delivered over the wall 14 so that the peanuts then move downwardly on the plate structure 10 downstream of the trough as shown in FIG. 3. The stones and other dense articles sink into the air streams moving upwardly in the trough 11. The jet streams of air escaping from the openings 17 are directed towards the mid-portion of the trough structure 11 because of the inclination of the vanes 38 and 39. The mechanical motion of the bottom wall 16 plus the action of the air streams move the stones and heavy material towards the midportion of the trough structure so that they move downwardly into the well 41. The stones and heavy articles escape through the chute 46. The hinged plate 48 is lifted against the gravitational force and the mechanical motion and the affects of the air serve to discharge the stones from the chute 46.

The cross sectional area of the opening at the top of the well 41 is approximately fifteen percent of the area of the perforated side walls 43 and 44 and the perforated bottom wall 45. Thus more air passes through the open upper end of the well 41 than through corresponding portions of the bottom wall 16 of the trough 11. The air streams discharged through the openings 17 decelerate rapidly as a consequence of the low pressure created around each stream. These decelerating jets of air create a soft cushion and peanuts finding their way into the trough 11 may not be lifted over the wall 15. Such peanuts along with the stones and other heavy material are shifted towards the well 41 but the peanuts are lifted over the wall 14 by the air escaping through the open upper end of the well 41.

While the invention has been shown and described in connection with a particular assembly it will be appreciated that changes may be made in the elements as well as the overall organization. Such modifications and others may be made without departing from the spirit and scope of the invention as set forth in the appended claims.

What I claim and desire to secure by Letters Patent is:

1. Apparatus for removing dense articles from peanuts comprising, a plate structure inclined to the horizontal adapted to receive peanuts with dense articles mixed therewith at the upper end thereof, means for virbrating said plate structure whereby the peanuts and stones move downwardly thereon with the dense articles gravitating below the peanuts, means providing a trough structure disposed transversely with respect to the length of said plate structure, said trough structure having a perforated bottom wall and a vertically disposed downstream wall extending upwardly from the perforated bottom wall, means for delivering air through the perforated bottom wall to provide jet streams of air moving upwardly within said trough to buoy the peanuts over said vertical downstream wall, and means providing a well in the midportion of said trough for collecting the dense articles which settle through said air streams, and means guiding the dense articles from said well.

2. Apparatus for removing dense articles from peanuts according to claim 1 wherein air is delivered into said well to lift any peanuts finding their way into the well over said vertical downstream well.

3. Apparatus for removing dense articles from peanuts according to claim 1 wherein the means providing the well comprises an apertured bottom wall and perforated side walls.

4. Apparatus for removing dense articles from peanuts according to claim 1 including vanes below said perforated bottom wall disposed to divert the upwardly moving air streams towards said well.

5. Apparatus for removing dense articles from peanuts according to claim 1 wherein the means guiding the dense articles from the well comprises a chute having a plate associated therewith biased to a position closing the chute.

References Cited
UNITED STATES PATENTS

| | | | |
|---|---|---|---|
| 343,891 | 6/1886 | Crocker | 209—149 X |
| 1,441,571 | 1/1923 | France | 209—158 X |
| 2,162,392 | 6/1939 | Solomon et al. | 209—137 |
| 2,828,011 | 3/1958 | Whitby | 209—20 |
| 3,097,161 | 7/1963 | Dudyak | 209—137 X |

HARRY B. THORNTON, *Primary Examiner.*

TIM R. MILES, *Assistant Examiner.*